March 12, 1940.  E. P. CODLING  2,193,121

TENSION CONTROL SYSTEM

Filed Aug. 13, 1938  2 Sheets-Sheet 1

WITNESSES:
Leon M. Garman
Leon J. Vaga

INVENTOR
Eldred P. Codling.
BY
Paul E. Friedemann
ATTORNEY

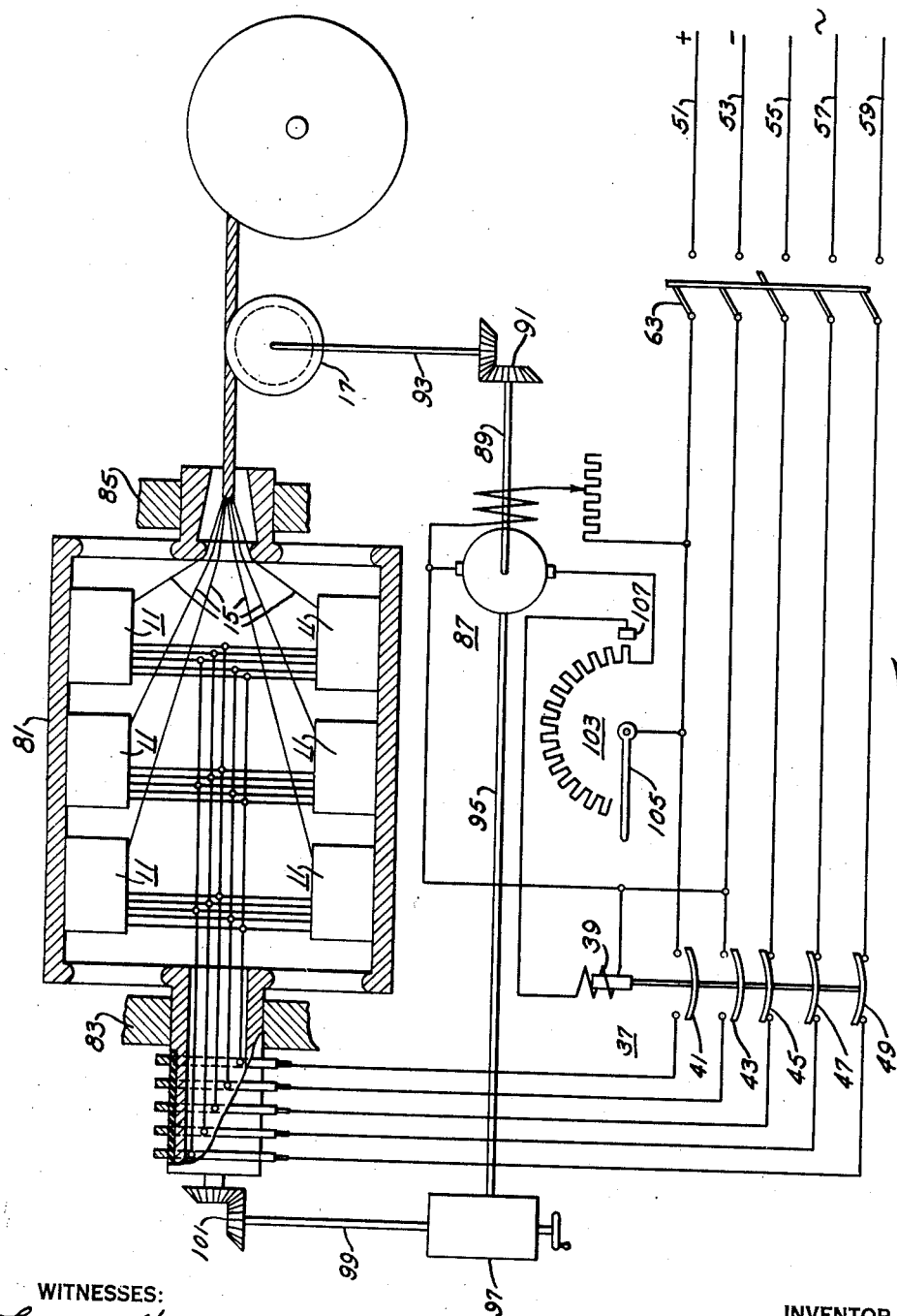

Patented Mar. 12, 1940

2,193,121

UNITED STATES PATENT OFFICE 2,193,121

TENSION CONTROL SYSTEM

Eldred P. Codling, Irwin, Pa., assignor to Westinghouse Electric & Manufacturing Company, East Pittsburgh, Pa., a corporation of Pennsylvania Application August 13, 1938, Serial No. 224,722

10 Claims. (Cl. 242—45)

My invention relates to control systems and it has particular relation to a system for controlling the tension of a material as it is unwound from a reel.

When a strand, a web, or material in other forms, is unwound from a reel the tension of the material may be maintained by braking means applied to the reel. The tension of the material varies because of the change in speed of the reel which results from the change in effective radius of the reel. This may be more clearly explained by the equation for power developed which is (1) Power $\propto$ torque $\times$ speed in R. P. M.

The required torque is, (2) Torque = tension $\times$ effective radius and, (3) Speed in R. P. M. $\propto \dfrac{\text{Linear speed (of material)}}{\text{Effective radius}}$ Therefore the power required is proportional to $$\text{Tension} \times \text{effective radius} \times \dfrac{\text{Linear speed}}{\text{Effective radius}}$$

or

Power $\propto$ tension $\times$ linear speed

If the linear speed of the material is maintained constant, then

Power $\propto$ tension

Therefore, to maintain constant tension the power developed by the braking means should be constant.

However, the power developed by the braking means of the prior art varies as a function of the speed in R. P. M. because its torque remains constant, and, therefore, the tension varies as a function of the speed in R. P. M. In the prior art special control means associated with the braking means were required to compensate for this change in speed if it was desired to maintain constant tension.

It is an object of my invention to provide a system for maintaining substantially constant tension in a material as it passes from a supply reel.

A further object of my invention is to provide tension developing means that shall be operable to maintain substantially constant tension in material as it is unwound from a supply reel.

A more specific object of my invention is to provide for maintaining substantially constant tension in a material as it is passed from a supply reel at a constant linear velocity.

An ancillary object of my invention is to provide for maintaining substantially constant tension in a plurality of strands as they are combined to form a cable.

While my invention will be explained in reference to a system for maintaining constant tension in a strand such as a wire or a cable, it will readily be understood that it may be utilized for maintaining a constant tension in a web, or in any other application where a constant load or braking effect at variable speed is required.

According to a preferred embodiment of my invention, a strand is advanced from a reel at a constant linear velocity. To maintain constant tension, a dynamo-electric machine or electric brake is mechanically connected to the reel. The electric brake comprises a squirrel-cage rotor winding and a stator winding energized by a constant unidirectional current. As hereinbefore explained, the power developed by the braking means must be constant to maintain constant tension. The essential characteristics of the electric brake may best be understood by explaining why the power developed by the brake remains constant when the speed is varied.

The current I in the squirrel-cage winding of the electric brake may be expressed as $$I = \dfrac{E}{Z} = \dfrac{E}{\sqrt{R^2 + X^2}}$$

where E is the generated electromotive force and Z is the impedance of the squirrel-cage winding. R is the resistance and X is the inductive reactance of the squirrel-cage winding.

$$E = k_1 \times \text{speed}$$

where $k_1$ is a constant.

If it is assumed that the resistance component R of the impedance Z is negligible compared with the inductive reactance X, then, $$Z = X = 2\pi f L \text{ (approx.)}$$

where $f$ is the frequency and L is the inductance of the squirrel-cage winding. Since L is constant for a particular machine and $f$ is proportional to the speed, then $$Z = k_2 \times \text{speed}$$

where $k_2$ is a constant
and $$I = \dfrac{k_1 \times \text{speed}}{k_2 \times \text{speed}} = \text{constant}$$

Power developed by the electric brake is equal to $I^2 R$, and since I is constant, power and thus tension will be constant when operating at variable speed.

The novel features that I consider characteristic of my invention are set forth with particularity in the appended claims. The invention itself, however, both as to its organization and its method of operation, together with additional objects and advantages thereof, will best be understood from the following description of specific embodiments, when read in connection with the accompanying drawings, in which:

Fig. 5 is a diagrammatic view of a modification of my invention.

Figure 1:
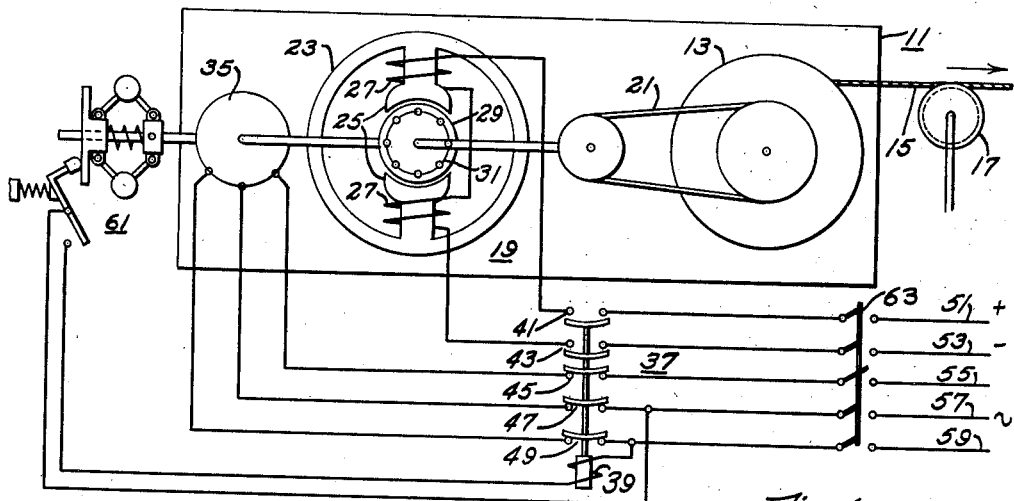
Figure 1 is a diagrammatic view of a control system organized in accordance with the present invention.

Referring more particularly to Fig. 1 of the drawings, reference character 11 represents a tension control unit comprising a roll or reel 13 upon which a strand 15 or any other material is carried. The strand 15 is advanced from the reel 13 at a constant linear speed by any suitable means well known in the art, such as a capstan 17.

Figure 2:
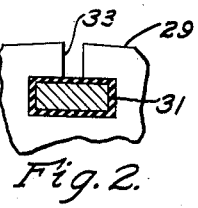
Fig. 2 is a partial view in section showing a rotor slot and conductor.

In order to maintain the tension of the strand 15 substantially constant, a dynamoelectric machine or electric brake 19 is mechanically connected to and driven by the reel 13. The electric brake may be directly coupled to the reel or it may be driven by means of a belt 21 as shown in the drawing. The electric brake 19 comprises a stator 23 having a plurality of salient poles 25 and field windings 27, and a rotor 29 having a squirrel-cage winding 31. The winding 31 is of a type having a high reactance, that is, the inductive reactance of the winding is high compared to the resistance. To obtain a high reactance each semi-closed slot 33 on the rotor 29 may be made substantially as shown in Fig. 2.

During the starting and the stopping of the movement of the strand 15 from reel 13, the linear speed will tend to vary, thus normally varying the tension of the strand 15. Furthermore, when the reel 13, and thus the rotor 29, is at rest, the electric brake 19 will produce no braking effect to maintain tension in the strand 15. Therefore, a torque motor 35 or any other suitable torque producing means is also mechanically connected to the reel 13 to maintain tension in the strand 15.

To obtain a more compact unit, the electric brake 19 and the torque motor 35 may be assembled in a common frame. Furthermore, since it will readily be understood that the electric brake may have non-salient poles instead of the salient poles 25, the stator winding of the torque motor 35 and the field windings 27 of the electric brake may be wound on the same stator, or one stator winding may be utilized to serve at alternate intervals as the stator winding of the torque motor and as the field winding of the electric brake. In either case, only one rotor winding will be required.

An electromagnetic device 37 having an operating coil 39 and a plurality of contact members 41, 43, 45, 47 and 49 is utilized to control the energization of the field windings 27 and the torque motor 35. The field windings 27 are connected to a constant potential source of unidirectional current (not shown) by means of contact members 41 and 43 through conductors 51 and 53. The torque motor 35 is connected to a suitable source of alternating current (not shown) by means of contact members 45, 47 and 49 through conductors 55, 57 and 59.

A centrifugally-operated device 61 is mechanically connected to the reel and disposed to be actuated at a predetermined speed of the reel 13 to energize the operating coil 39.

Figure 3:
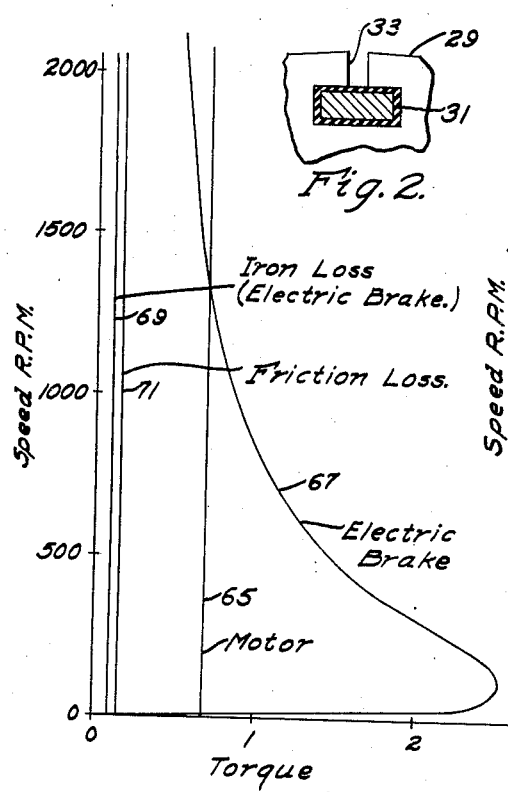
Figs. 3 and 4 illustrate graphically the operation of the arrangement shown in Fig. 1.

To place the system shown in Fig. 1 in operation, a multi-contact switch 63 is closed thereby energizing the torque motor 35 to apply a constant torque as indicated by curve 65, Fig. 3, to the reel 13. The capstan 17 is accelerated until the strand 15 reaches a predetermined linear speed. When the reel 13 reaches a predetermined speed in R. P. M., the centrifugal device 61 is actuated thus energizing operating coil 39. Preferably, but not necessarily, the contact members 41 and 43 are disposed to be closed substantially simultaneously with the opening of contact members 45, 47 and 49 when electromagnetic device 37 is actuated by the energization of operating coil 39. The torque motor 35 is thus deenergized and the field windings 27 of electric brake 19 are energized. As the strand 15 advances from the reel 13, thereby decreasing the effective radius of the reel 13, the rotational speed of the reel 13 and the rotor 31 of the electric brake 19 are increased. The tension of the strand 15 is maintained substantially constant because, as was hereinabove explained, the power developed by the electric brake 19 remains substantially constant as the speed of the reel is increased.

Curve 67 (Fig. 3) shows, generally, how the torque of the electric brake 19 varies in relation to the speed in R. P. M. Curves 69 and 71 represent the iron loss torque and the friction loss torque, respectively, of the electric brake 19. Because of the iron loss and the friction loss the tension of the strand 15 increases slightly as the rotational speed increases when the linear speed of the strand is constant and only the electric brake 19 is utilized for maintaining tension. This is illustrated by a curve 73 in Fig. 4. In comparison, a curve 75 shows how the tension would vary if only the torque motor 35 were utilized for maintaining tension.

In the manufacture of electric cables, especially such as are used in the communication arts, it is generally desirable to maintain the distributive capacity of the cable constant. This may be accomplished by maintaining the tension of the individual strands constant when the strands are combined to form a cable.

In Fig. 5, a plurality of strand supplies such as the tension control units 11 described with reference to Fig. 1 are mounted in a twisting unit 81. The twisting unit 81 is mounted in bearings 83 and 85 to be rotatable about its axis. To intertwist the strands at a uniform pitch, the ratio of the linear speed of advance of the strand to the rotational speed of the twisting unit is maintained constant. This may be accomplished by utilizing any suitable driving unit such as, for example, a motor 87. The motor 87 drives the capstan 17 through a shaft 89, gears 91 and shaft 93, and it drives the twisting unit 81 through shaft 95, adjustable reduction gears 97, shaft 99 and gears 101. A controller 103 is provided to control the acceleration of the motor 87.

The operation of the tension control units 11 is similar to that hereinabove described with reference to Fig. 1 except that the centrifugal devices 61 have been omitted and the energization of the torque motors 35 and field windings 27 of electric brakes 19 are controlled simultaneously by means of the electromagnetic device 37.

Figure 4:
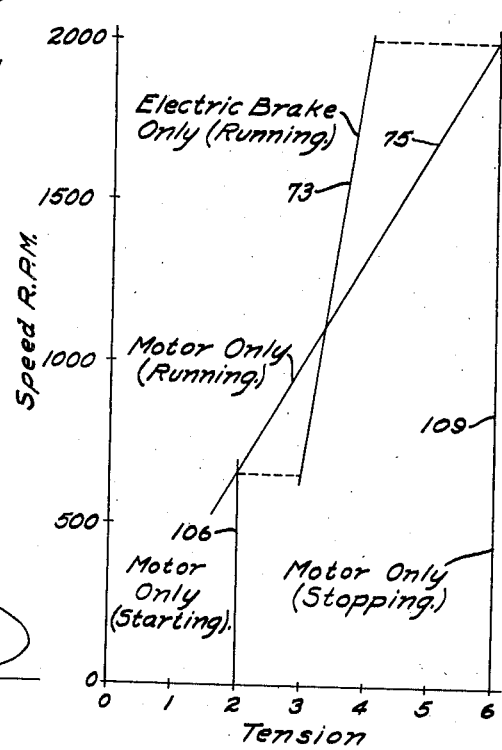

When switch 63 is closed, the torque motors 35 become energized and tension is thus applied to the strands 15. Arm 105 of controller 103 is advanced in a clockwise direction to energize and accelerate the motor 87. Thus the strands 15 are advanced and the twisting unit 81 is rotated to intertwist the strands. Assuming constant effective radius of the reel during acceleration, this initial tension may be represented by a curve 106 (Fig. 4). When the arm 105 has been advanced until the motor 87 reaches a predetermined speed, which may be substantially full speed, it completes a circuit through contact segment 107 to energize operating coil 39 thus actuating electromagnetic device 37 thereby deenergizing torque motors 35 and energizing field windings 27 of electric brakes 19. A slight change in tension results from this transfer and it may be represented by the change from curve 106 to curve 73. As shown by curve 73, substantially constant tension of strands 15 is then maintained during the normal running operation in the manner hereinabove described.

To stop the operation of the system, the arm 105 is returned to the position shown in Fig. 5, thus opening the circuit to operating coil 39. Electric brake 19 becomes deenergized and torque motor 35 becomes energized. Because of the decreased effective radius of the reel, the tension of the strands may be represented generally by curve 109 if it is assumed that the effective radius is constant during deceleration.

I do not wish to be restricted to the specific structural details, arrangement of parts, or circuit connections herein set forth, as various other modifications may be effected without departing from the spirit and scope of my invention. I desire, therefore, that only such limitations shall be imposed as are indicated in the appended claims.

I claim as my invention:

1. In a system for combining a plurality of strands, in combination, a plurality of strand supplying means, means for advancing the strands at a substantially constant linear speed, and means cooperatively associated with each strand supplying means for maintaining a predetermined tension in the strands, each of the said tensioning means comprising a dynamo electric machine having a relatively highly reactive squirrel-cage rotor winding and a field winding, means for connecting the said field winding to a constant potential source of unidirectional current.

2. In a system for combining a plurality of strands, in combination, a plurality of strand supplying means, means for normally advancing the strands at a constant linear speed, means for controlling the said advancing means, electric torque producing means cooperatively associated with each strand supplying means for maintaining a predetermined tension in the strands, each of the said torque producing means comprising an alternating current motor and a dynamo electric machine having a relatively high reactance rotor winding and a field winding, and means cooperatively associated with the control means for connecting the said alternating current motor to a source of alternating current when the said advancing means advances the strands at a speed below a predetermined magnitude and for connecting the said field winding of the dynamo electric machine to a source of constant potential unidirectional current when the strands are being advanced at a speed above the predetermined magnitude.

3. In combination, tensioning means for a material passing from a roll at a constant linear speed, comprising a dynamo electric machine driven by said roll, said dynamo electric machine having a field winding and a relatively high reactance squirrel-cage rotor winding, and means for connecting the said field winding to a source of constant potential unidirectional current.

4. In combination with a roll having a supply of material wound thereon, means for normally drawing the material from the roll at a constant linear speed, of electric torque producing means cooperatively associated with said roll for maintaining tension in the said material, the said torque producing means comprising an alternating current motor and a dynamo electric machine having a high reactance rotor winding and a field winding, means for connecting the said alternating current motor to a source of alternating current when the speed of said roll is below a predetermined magnitude and for connecting the said field winding of the dynamo electric machine to a source of constant potential unidirectional current when the speed of said roll is above a predetermined magnitude.

5. In combination, tensioning means for a material passing from a roll at a constant linear speed, comprising a dynamo-electric machine driven by said roll and capable of automatically developing substantially constant power as the effective radius of the roll varies, said dynamo-electric machine having a field winding and a relatively high reactance squirrel-cage rotor winding, and means for connecting the said field winding to a source of constant potential unidirectional current.

6. In combination, tensioning means for a material passing from a roll, comprising a dynamo-electric machine driven by said roll and capable of developing substantially constant power as the effective diameter of the roll varies, said dynamo-electric machine having a field winding, an alternating current torque motor mechanically coupled to the said dynamo-electric machine, means for connecting the field winding of the dynamo-electric machine to a source of constant potential unidirectional current when the material is passing from the roll at a predetermined linear speed, and means for energizing the said torque motor from a source of alternating current when the material is passing from the roll at a linear speed below the predetermined magnitude.

7. In combination, tensioning means for a material passing from a roll, comprising means for starting and stopping the operation of said roll, a dynamo-electric machine driven by said roll and capable of developing substantially constant power as the effective diameter of the material roll varies when the linear speed of the material is substantially constant, means for rendering said dynamo-electric machine ineffective during the starting and stopping of the roll, and means for applying a substantially constant predetermined tension to the material when said dynamo-electric machine is rendered ineffective.

8. In combination with a roll having a supply of material wound thereon, means for normally advancing the material from the roll at a substantially constant linear speed, means for starting and stopping the operation of the said advancing means, of electric torque producing means cooperatively associated with said roll for maintaining substantially constant tension in the said material, the said torque producing means comprising an alternating current motor and a dynamo-electric machine having a relatively high reactance rotor winding and a field winding, means for connecting the said field winding to a source of constant potential unidirectional current during the starting operation of the said advancing means, and means for energizing the said alternating current motor when the said field winding is deenergized.

9. In combination with a roll from which a material is normally advanced at a predetermined constant linear speed, means including a dynamo-electric machine having a field winding and a relatively high reactance squirrel-cage rotor winding, and capable of developing constant power as the effective diameter of the roll varies when the linear speed of the material is constant, control means cooperatively associated with said roll for rendering the said dynamo-electric machine effective to maintain substantially constant tension in the material when the speed of the roll reaches a predetermined magnitude, and means, rendered effective by the said control means, for maintaining tension in the material when the speed of the said roll is below a predetermined magnitude.

10. In combination with a roll having a supply of material wound thereon, means for normally advancing the material from the roll at a substantially constant linear speed, means for starting and stopping the operation of the said advancing means, of electric torque producing means cooperatively associated with said roll for maintaining substantially constant tension in the said material, the said torque producing means comprising an alternating current motor and a dynamo-electric machine having a squirrel-cage rotor winding and a field winding, means for connecting said field winding to a source of constant potential unidirectional current a substantial time interval after the starting operation has been initiated, means for deenergizing the said field winding after the stopping operation has been initiated, and means for energizing the said alternating current motor when the said field winding is deenergized.

ELDRED P. CODLING.